April 13, 1948. H. J. FINDLEY 2,439,687
MOLD-IN THREAD INSERT
Filed Aug. 26, 1944
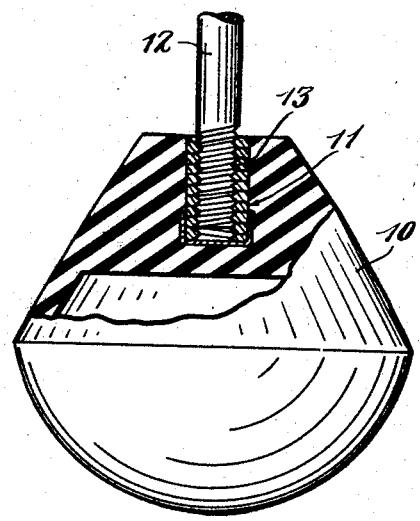
FIG. 1
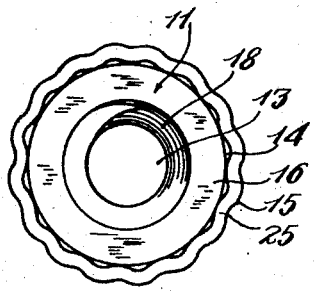
FIG. 3
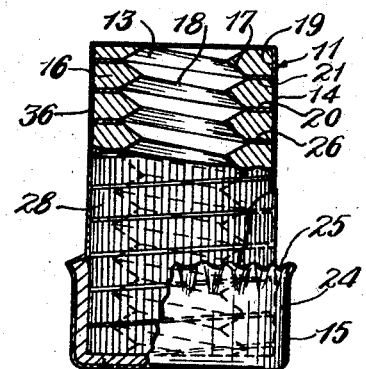
FIG. 2
FIG. 5
FIG. 6
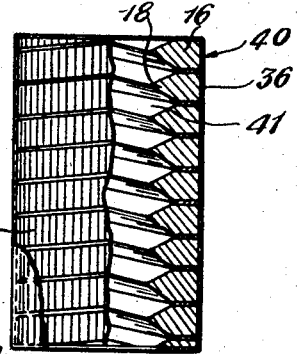
FIG. 4
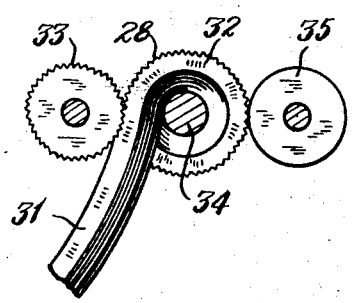
FIG. 7
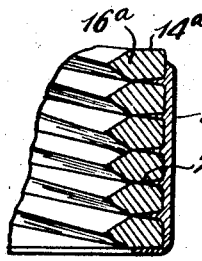
FIG. 8
INVENTOR.
HOWARD J. FINDLEY
BY Kwis Hudson
Baughton & Williams
ATTORNEYS Patented Apr. 13, 1948

2,439,687

UNITED STATES PATENT OFFICE 2,439,687

MOLD-IN THREAD INSERT

Howard J. Findley, Chardon, Ohio, assignor to Eaton Manufacturing Company, Cleveland, Ohio, a corporation of Ohio Application August 26, 1944, Serial No. 551,335

3 Claims. (Cl. 85—32)

This invention relates to thread inserts of the kind made from helically coiled wire, and aims to provide a novel insert of this type which can be used for various purposes but is especially suited for molding in place in a body being molded so as to provide the molded body with an internally threaded opening.

Another object of this invention is to provide a novel thread insert of this character, which is of a strong and economical construction and which will be strongly held by the body into which it is molded.

A further object of the present invention is to provide a novel thread insert of the character mentioned, having means for closing the inner end of its threaded opening to prevent the entry of material during the molding operation.

Still another object of this invention is to provide a novel thread insert of this kind having a substantially cylindrical exterior whose surface characteristic is such that a strong bond will be formed between the insert and a body of rubber or other material into which the insert is molded.

This invention also provides an improved construction for articles molded from rubber or various other materials, in which the article is provided with an internally threaded opening by molding the above-mentioned novel insert in place therein.

Other objects and advantages of the present invention will be apparent from the following description when taken in conjunction with the accompanying sheet of drawings in which—

Fig. 1 is an elevational view, partly in section, showing an article having a thread insert molded in place therein as contemplated by this invention.

Fig. 2 is a side elevation, partly in section, and on a larger scale, showing one form of the novel thread insert.

Fig. 3 is an end view of the insert.

Fig. 4 is a side elevation, partly in section, showing another form of the novel thread insert of this invention.

Fig. 5 is a cross-sectional view showing one form of wire which can be used in making the novel insert.

Fig. 6 is a perspective view showing another form of wire which can be used in making the novel insert.

Fig. 7 is a view illustrating the operation of rolling the wire to helical form and simultaneously knurling or serrating such wire, and Fig. 8 is a partial sectional view taken through a brazed insert and further illustrating the construction thereof.

Before proceeding with a more detailed description of the invention it can be advantageously explained at this point that the present invention is especially useful in connection with articles or parts which are molded from rubber, or various other materials, and which are required to have reenforced internally threaded openings. Internally threaded inserts have been used heretofore for this purpose in molded articles but, so far as I am aware, such inserts have always been in the form of solid sleeves or bushings produced by screw machine operations and having internal threads cut therein. Thread inserts formed of helically coiled wire, as provided by this invention, can be produced much more rapidly and economically than solid bushings made by screw machine operations and whereas such solid bushings are usually made of brass, the novel insert of this invention can be made from steel wire which is stronger and less expensive. This application is, in part, a continuation of my earlier application Serial No. 504,393 filed September 30, 1943.

By way of example, Fig. 1 shows one form of molded body or article 10 having the novel thread insert 11 of this invention molded therein so as to provide the article with an internally threaded opening 13. The article 10 shown in this instance is a flush-tank ball valve of a conventional shape and formed of molded rubber. The thread insert 11 is molded in place in the valve ball 10 and provides the latter with the internally threaded opening 13 which is adapted to receive the threaded end of a valve stem or actuating rod 12. It will be understood, of course, that the insert 11 can also be molded in place in numerous other bodies or articles formed of various substances such as metals and alloys as well as thermoplastic and thermo-setting materials.

The construction of the insert 11 is further illustrated in Figs. 2 and 3 and, as here shown, comprises a bushing 14 and a closure means 15 on the inner or lower end thereof which closes the opening of the bushing at said inner end so as to prevent the rubber or other material, in which the bushing is being molded in place, from flowing into the opening of the insert. The bushing 14 is formed by a wire 16 of steel or other suitable metal wound to helical form and having its convolutions in tight or contiguous relation to each other, that is to say, in substantially coextending engagement with each other. The wire 16 has a beveled or tapered longitudinal inner edge 17 which provides a preformed thread 18 in the opening 13 of the bushing when the wire has been wound to helical form. The wire initially has a substantially flat outer face or edge 19 which forms a plain or unthreaded substantially cylindrical exterior when the wire is wound into the form of a bushing. The wire 16 preferably also has flat sides or faces 20 and 21 and is of a thickness such that when it is wound to helical form and to the desired diameter, the thread 18 formed by the beveled edge 17 will have a desired diameter and pitch to correspond with the diameter and pitch of the threaded member which is to be screwed into the insert.

The closure means 15 is preferably in the form of a cap having a transverse wall or bottom 23 which is engaged by an end of the bushing 14, and a substantially cylindrical skirt or sleeve 24 which telescopes around such end of the bushing and has a relatively tight fit thereon. The edge of the sleeve or skirt 24 is serrated or jagged as indicated at 25 so as to provide the exterior of the insert 11 with an annular shoulder of a rough and irregular nature. When the insert 11 is being molded in place in a body such as the valve ball 10 described above, the cap 15 prevents the material from entering the threaded opening 13 of the insert and the jagged annular shoulder 25 serves as a means for retaining or locking the insert strongly in place in the molded body.

For strengthening the insert 11 and preventing the convolutions thereof from being spread apart when a threaded member is screwed thereinto, the adjacent convolutions of the wire 16 are connected with each other by brazing or soldering 26, or the like located between the faces of such adjacent convolutions. The brazing of the adjacent convolutions together for this purpose can be accomplished by the use of any suitable brazing apparatus or operations.

In addition to the holding or locking effect obtained from the serrated shoulder 25 of the cap 15, it is desirable to provide the cylindrical exterior of the bushing 14 with a roughened surface characteristic. This can be obtained by knurling or serrating the flat outer face or edge 19 of the wire 16 as indicated at 28. The knurling or serrating of the outer edge of the wire can be accomplished during the initial rolling of the wire to the cross-sectional shape desired for forming the insert 11. Fig. 6 of the drawing shows a wire 29 of a cross-sectional shape suitable for the forming of a thread insert of this character and which has its flat outer edge 30 provided with the serrations 28. Instead of using a wire having preformed serrations 28 thereon, the serrations or knurling can be formed on the outer edge of the wire during the rolling of the wire to bushing form. Fig. 7 of the drawing shows a wire 31 of a desired cross-sectional shape being wound into a bushing 32 during the forming of an internally threaded insert and shows the knurling or serrations 28 being formed on the wire by a knurling roller or die 33 during such winding operation. This winding operation can be carried out by the use of a mandrel 34 on which the wire 31 is wound and a backing roll 35 which engages the bushing being formed.

It is also desirable that the insert 11 have a metallic coating 36 thereon so as to render the insert non-corrosive and to give the insert a surface characteristic such that a stronger bond will be formed when the insert is molded in place in certain materials such as in a body of rubber. The coating 36 is preferably of copper or of a copper alloy such as brass and extends as a continuous layer over the cylindrical exterior of the bushing 14 and over the exterior of the cap 15. This coating may also extend over the exposed outer or upper end of the bushing and, in certain instances, will also extend over the faces of the thread 18.

The coating 36 can be obtained on the insert in various ways such as by treating the inserts in tumbling barrels or by electrolytic action, or by using the copper-clad steel wire 37 of Fig. 5 for forming the insert. When copper-clad wire is used in forming the insert the coating 36 will also extend over the faces of the thread 18. The brazing operation, by which the adjacent convolutions of the bushing are joined together by the intervening material 26, can be carried out at any appropriate point in the manufacture of the insert but is preferably done after the coating 36 of copper or copper alloy is on the bushing. The serrations 28 provided on the wire 16 are preferably of a depth of coarseness such that the coating 36 does not prevent these irregularities from imparting to the exterior of the insert a desired surface roughness.

In Fig. 4 of the drawing, I show a thread insert 40 which is identical in construction with the insert 11 above described, with the exception that the closure means or cap 15 has been omitted. The thread insert 40 can be used in the same manner and for the same purposes as the insert 11 and may be preferred in instances where the flow of material into the threaded opening 41 of the bushing during the molding operation, is not objectionable.

Although the inserts 11 and 40 are especially suitable for use in molded articles they can also be used for other purposes as has been stated above. Both of the inserts 11 and 40, and particularly the latter, can be used in preformed openings of bodies of, wood, metal, plastic or the like for providing a reinforced internally threaded opening therein, and in both of these inserts the beveled edge on the wire provides a preformed internal thread. It should be understood also that, if desired, the coating 36 can be omitted from either or both of these inserts.

Another way of making my brazed and coated insert is to wind steel wire 16a or the like to helical form to provide the internally threaded bushing 14a, as above explained, and then plating or otherwise depositing or forming the coating 36a of copper or copper alloy on the bushing. The coated bushing is then subjected to a brazing operation during which some of the coating 36a flows in between the adjacent convolutions as the intervening brazing material 26a which permanently connects the convolutions together. Fig. 8 of the drawings shows the insert construction just described and in which the coating 36a on the exterior of the bushing may be a comparatively thick layer and the intervening layer 26a of brazing material may be a comparatively thin layer.

From the foregoing description and the accompanying drawing, it will now be readily understood that the present invention provides a novel thread insert having important advantages over inserts in the form of the internally threaded solid sleeves heretofore produced by screw machine operations. This novel insert is less expensive and uses less material than the inserts produced by such screw machine operations. Moreover, the present insert can be made from steel wire and when provided with a coating of copper, or copper alloy such as brass, it is resistant to corrosion and forms a good bond with rubber and various other plastics. The present insert is also lighter in weight and can be manufactured by the use of simple wire winding apparatus thus conserving available screw machines for the manufacture of other articles. Another important advantage of the present insert is that the preformed thread provided by the beveled edge of the wire extends for the full length of the insert thus eliminating the additional material and length usually required to provide clearance for the inner end of the tap when solid sleeves are produced on screw machines.

Although I have illustrated and described my novel thread insert and its intended use in considerable detail, it will be understood that I do not wish to be correspondingly limited but regard my invention as including all changes and modifications coming within the spirit of the invention and the scope of the appended claims.

Having thus described my invention, I claim:

1. As an article of manufacture a mold-in thread insert in the form of a preformed unitary member consisting of a bushing formed of helically coiled wire of a cross-sectional shape to provide the bushing with a preformed internal thread and a substantially cylindrical exterior, said bushing having its adjacent convolutions substantially in coextensive engagement with each other and connected together by brazing or the like, and a cap telescoped over one end of the bushing and closing the opening of the bushing at said one end, said cap having an irregular edge forming an annular shoulder on said cylindrical exterior.

2. As an article of manufacture a thread insert in the form of a preformed unitary member consisting of a bushing formed of wire having opposed substantially square and beveled edges, said wire being helically coiled with its beveled edge providing a preformed thread in the bushing and its square edge providing a substantially cylindrical exterior on the bushing, the adjacent convolutions of the bushing being connected together by brazing or the like and said square edge of the wire having serrations thereon providing said exterior of the bushing with a roughened surface characteristic.

3. In combination, a body formed of molded material, and a thread insert connected with said body by being molded in place therein, said insert comprising a preformed bushing made of helically coiled wire of a cross-sectional shape to provide the bushing with a preformed internal thread and a substantially cylindrical exterior, the convolutions of said bushing being substantially in contiguous engagement with each other and joined together by brazing or the like, and a cap telescoped over the inner end of the bushing so as to close the opening of said inner end against the entry of the material during the molding operation and also forming an annular shoulder on said exterior for retaining the insert in the molded body.

HOWARD J. FINDLEY.

REFERENCES CITED

The following references are of record in the file of this patent:

UNITED STATES PATENTS

| Number | Name | Date |
|---|---|---|
| 254,559 | Lothrop | Mar. 7, 1882 |
| 726,405 | Coffman et al. | Apr. 28, 1903 |
| 1,167,759 | Hopkins | Jan. 11, 1916 |
| 1,669,854 | Bugg | May 15, 1928 |
| 1,742,761 | Fullerton | Jan. 7, 1930 |
| 1,966,520 | Rayner | July 17, 1934 |
| 2,061,807 | Noble | Nov. 24, 1936 |
| 2,210,353 | Barnes | Aug. 6, 1940 |
| 2,263,223 | Protin | Nov. 18, 1941 |
| 2,304,107 | Leisure | Dec. 8, 1942 |
| 2,358,707 | Haas | Sept. 19, 1944 |
| 2,407,879 | Haas | Sept. 17, 1946 |

FOREIGN PATENTS

| Number | Country | Date |
|---|---|---|
| 21,912 | Germany | Dec. 8, 1942 |